Patented July 29, 1924.

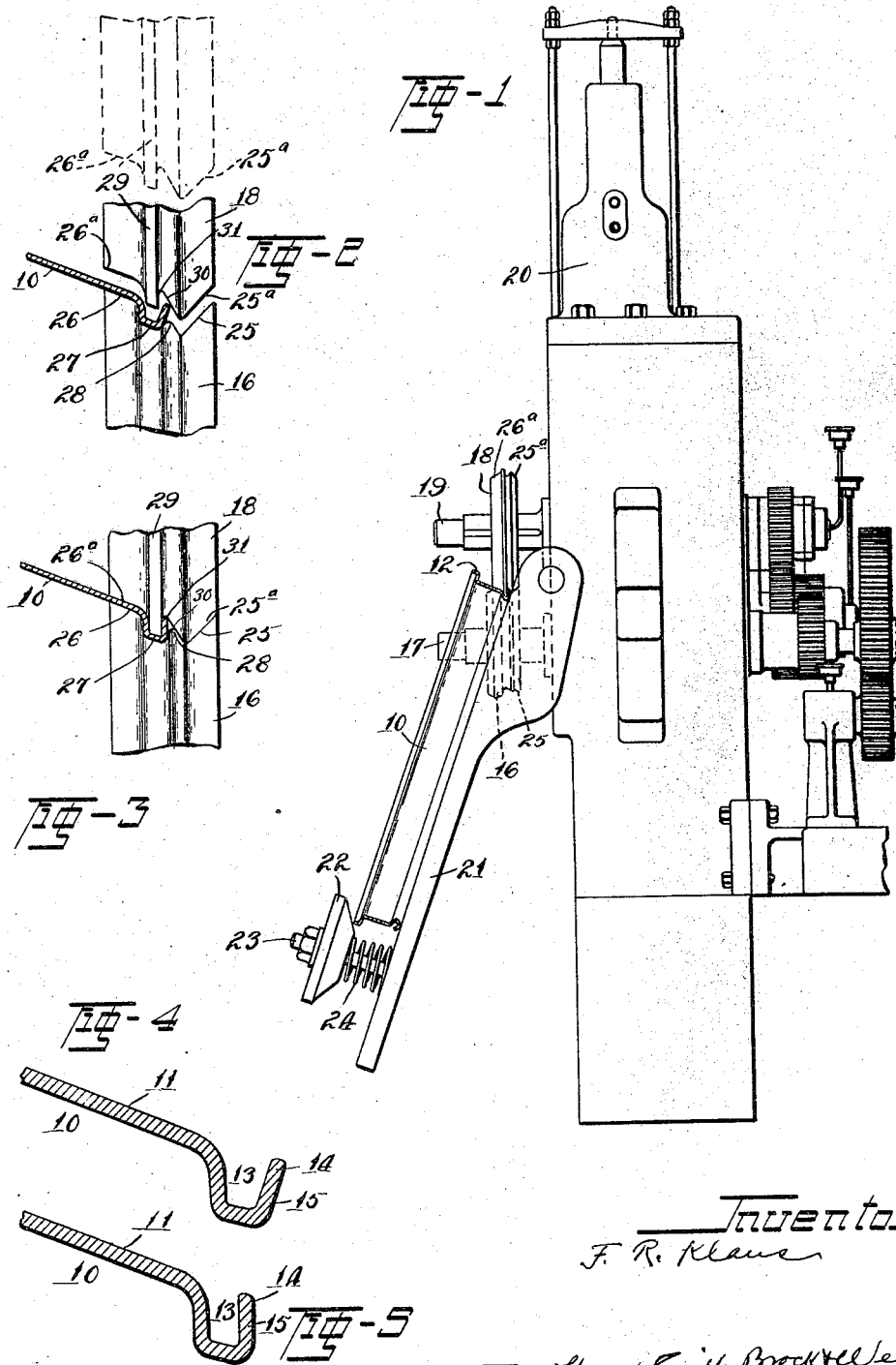

1,503,270

UNITED STATES PATENT OFFICE.

FRED R. KLAUS, OF CLEVELAND, OHIO, ASSIGNOR TO THE HYDRAULIC PRESSED STEEL COMPANY, OF CLEVELAND, OHIO, A CORPORATION OF OHIO.

RIM-ROLLING MACHINE.

Application filed May 23, 1919. Serial No. 299,261.

*To all whom it may concern:*

Be it known that I, FRED R. KLAUS, a citizen of the United States, residing at Cleveland, in the county of Cuyahoga and State of Ohio, have invented a certain new and useful Improvement in Rim-Rolling Machines, of which the following is a full, clear, and exact description, reference being had to the accompanying drawings.

This invention relates generally to machines for rolling sheet metal rims, and more particularly to one designed to roll an inclined groove in the outer edge of a tire carrying rim; said inclined groove being adapted to receive a tire retaining ring or flange, generally known in the automobile trade as "Q. D. rings."

The object of the invention is to provide a machine which will quickly and accurately roll the groove in the outer edge of the rim, at the proper angle and without cracking or unduly stretching the metal at the base of the groove.

Another object is to provide a machine in which it is only necessary to place the rim upon one roll and then bring the other roll into engagement therewith, in order to effect the proper grooving of the edge, the rim being maintained always at the proper angle, thereby eliminating manual control and its attendant uncertainty of action.

With these objects in view and certain others which will become apparent as the description proceeds, the invention consists in the novel features of construction, and in the manner of combining or arranging them, all of which will be more fully set forth hereinafter and then pointed out in the appended claims.

In the drawings forming a part of this specification, Fig. 1 is a side elevation of a rim rolling machine embodying the invention; Fig. 2 is a view of the rolls separated for the introduction of the rim to be grooved; Fig. 3 is a similar view showing the movable roll as it engages the rim arranged upon the fixed roll; Fig. 4 is a cross section of a rim before the groove is shaped, and Fig. 5 is a similar view of the rim after the groove has been properly shaped.

The rims which are rolled upon this machine may be demountable tire carrying rims or they may be permanently attached to the wheel, or it may be the rim of a wire wheel.

The rim 10 as first rolled is formed with base 11, inner tire engaging flange 12, and groove 13 in the outer side of the rim the extreme outer edge 14 being about $\frac{1}{32}''$ above or beyond the outer face of the base. The inner face 15 of the outer wall of the groove is substantially perpendicular to the base of the rim and this makes the groove 13 widest at its outer or open end, and it is necessary to reshape this groove in order that it may retain a Q. D. ring when placed therein, and in reshaping this groove it is necessary to roll the outer edge 14 inwardly, both laterally and radially, and shift the face 15 from the perpendicular to an angle of 20° inwardly from the perpendicular, and the edge 14 must be flush with the outer face of the base of the rim; and all these operations must be accomplished without weakening the metal as great strains are placed upon this grooved edge by the internal tire pressure.

To accomplish the reshaping of this groove, two rolls are employed, one 16, mounted upon the end of a rotary shaft 17 which turns in fixed bearings and receives its motion from any suitable source transmitted in any approved manner; the other or upper roll 18 is mounted upon the end of the rotary shaft 19, and this shaft is preferably moved up and down by means of a fluid operated cylinder 20, and is provided with a gear intermeshing with one carried by the lower shaft, so that the two rolls 16 and 18 operate in unison to shape and revolve the rim placed therebetween.

As previously stated, the rim is first rolled into the shape shown in Fig. 4, and then reshaped as shown in Fig. 5, and in order to do this it is not only necessary to provide a novel form of rolls, but also properly support the free portion of the rim during the rolling operation, and this is provided in the form of a rest or table 21 fixed at an angle of 20° and provided at its lower end with a retaining roller 22, mounted upon a stud 23 and maintained in its outer or guiding position by means of a spring 24 coiled around the stud 23 and bearing against the bottom of the roller 22.

The faces of the rolls 16 and 18 are complementary in part only; that is, the inclined face 25 of the roll 16 corresponds with or is complementary with face 25$^a$ of roll 18, and these faces contact with each other at the completion of the reshaping operation. The face 26 receives the inner face of the rim base thereon and the grooved face 27 receives the inrolled edge of the rim as shown in Fig. 2, and between this grooved face 27 and the flat face 25 is a rounded shoulder portion 28.

The upper roll has a face 26ª which is substantially complementary with the face 26, and next to this face is a bead, rib or collar 29 which is of a width to shape the groove in the rim and between this bead, rib or collar 29 is a groove having the inclined side 30 and this face 30 meets the face 25ª in a sharp angle, but is rounded off as it meets the face of the rib or bead 29 as shown at 31. The faces 26 and 26ª engage the base of the rim, the portions 27 and 29 engage the groove in the rim, and the face 30 engaging the extreme edge of the rim carries the same back as the faces 26, 26ª, 27 and 29 hold the rim at the proper angle, and when the faces 25 and 25ª engage each other the reshaping operation has been completed and the outer wall of the groove will have been turned back without impairing its strength, as the metal has been redistributed without cracking or undue stretching.

When the rim is placed upon the fixed or lower roll, its free end will rest upon the table or support 21 and the free movement of the roller 22 permits the rim to find its place beneath this roller and then during the rolling operation the inner edge of the rim will roll against the beveled face of the roller, which keeps it in place upon the table or rest.

Just as soon as the rim is positioned upon the lower roll, the upper roll is moved down engaging the rim in the manner described and the complete reshaping of the groove at the outer edge of the tire carrying rim is quickly accomplished, and owing to the shape of the rolls and the manner of supporting the rims these grooved edges will be reshaped with uniformity and accuracy.

Having thus described my invention, what I claim is:—

1. In a machine of the kind described the combination with an inclined table for supporting a rim having a grooved side, of a pair of flange bending rolls, means associated with the table for holding the rim in operative position with respect to the rolls, said rolls being shaped to fit the groove of the rim, one of said rolls having a surface adapted to engage the edge of said groove and change the position of the same.

2. In a machine of the kind described the combination with a table for supporting a rim having a grooved side; of a roll adapted to receive said grooved side, and a cooperating flange bending roll adapted to be moved into engagement with said grooved side, said roll having a surface adapted to engage the edge of said grooved sides and change the position of the same.

3. In a machine of the kind described, the combination with a table for supporting a rim having a grooved side, a supporting roll, adapted to receive the grooved side of said rim, a flange bending roll having a portion to enter the groove of the rim and another portion inclined to the first named portion and engaging the edge of the groove to change the position of the same.

4. In a machine of the kind described, a supporting roll having the surfaces 26, 27 and 28 for receiving and supporting the grooved side of a rim, and a flanging roll having the surfaces 26ª, 29 and 30, together with means for imparting motion and pressure to said rolls.

5. In a machine of the kind described, a supporting roll having the surfaces 25, 26, 27 and 28 for receiving and supporting the grooved side of a rim, and a flanging roll having the surfaces 25ª, 26ª, 29, 30 and 31 for engaging and reshaping said grooved side of rim together with means for imparting pressure and motion to said rolls.

6. In a machine of the kind described, the combination with a shaping roll having a portion adapted to fit into the rolled over side of a rim and having a portion adapted to receive the actual edge of said rim, and a second roll adapted to engage the rolled over side of the rim and hold the actual edge in rolling position within the aforesaid first named roll.

In testimony whereof, I hereunto affix my signature.

FRED R. KLAUS.